United States Patent
He et al.

(10) Patent No.: US 11,406,990 B2
(45) Date of Patent: Aug. 9, 2022

(54) ELECTROSTATIC-PRECIPITATOR AIR CLEANER

(71) Applicant: Ching-Wen Liu, Taichung (TW)

(72) Inventors: Jhong-Ruei He, Taichung (TW); Yi-Shan Chen, Taichung (TW)

(73) Assignee: Ching-Wen Liu, Taichung (TW)

( * ) Notice: Subject to any disclaimer, the term of this patent is extended or adjusted under 35 U.S.C. 154(b) by 291 days.

(21) Appl. No.: 16/735,624

(22) Filed: Jan. 6, 2020

(65) Prior Publication Data
US 2020/0306766 A1   Oct. 1, 2020

(51) Int. Cl.
| | | |
|---|---|---|
| *B03C 3/82* | (2006.01) | |
| *B03C 3/49* | (2006.01) | |
| *F24F 3/16* | (2021.01) | |
| *F24F 8/192* | (2021.01) | |

(52) U.S. Cl.
CPC ............... *B03C 3/82* (2013.01); *B03C 3/49* (2013.01); *F24F 8/192* (2021.01)

(58) Field of Classification Search
CPC combination set(s) only.
See application file for complete search history.

(56) References Cited

U.S. PATENT DOCUMENTS

| | | | | |
|---|---|---|---|---|
| 1,322,163 | A * | 11/1919 | Conover | B03C 3/41 96/97 |
| 4,230,466 | A * | 10/1980 | Michel | B03C 3/41 361/230 |
| 6,899,745 | B2 * | 5/2005 | Gatchell | B03C 3/08 55/DIG. 38 |
| 6,962,620 | B2 * | 11/2005 | Chang | B03C 3/32 96/60 |
| 7,014,686 | B2 * | 3/2006 | Gatchell | B03C 3/08 96/51 |
| 9,962,711 | B2 * | 5/2018 | Chen | B03C 3/12 |
| 10,639,646 | B2 * | 5/2020 | Chen | B03C 3/12 |
| 2007/0180996 | A1 * | 8/2007 | Paterson | B03C 3/365 96/60 |

FOREIGN PATENT DOCUMENTS

GB          401932 A * 11/1993 ............... B03C 3/06

\* cited by examiner

*Primary Examiner* — Christopher P Jones
*Assistant Examiner* — Sonji Turner

(57) ABSTRACT

An electrostatic-precipitator air cleaner includes a base, a shell, a fan, a barrel, a high-voltage discharge module, a distribution module and a precipitation module. The shell is connected to the base. The fan is connected to an upper portion of the shell. The barrel is connected to the shell above the base. The high-voltage discharge module is connected to the base and inserted in the barrel. The distribution module is connected to the high-voltage discharge module. The precipitation module is inserted in the barrel.

10 Claims, 15 Drawing Sheets

ELECTROSTATIC-PRECIPITATOR AIR CLEANER

BACKGROUND OF INVENTION

1. Field of Invention

The present invention relates to an air cleaner and, more particularly, to an electrostatic-precipitator air cleaner.

2. Related Prior Art

A conventional indoor electrostatic precipitator used to improve air quality includes an external tube, an internal tube, discharge electrodes and collection electrodes. The external tube is made of an electrically conductive material. The internal tube is made of an electrically insulating material. The external tube is concentric with the internal tube. Air can go through a channel between the external and internal tubes. The discharge electrodes are arranged around an external face of the internal tube. The collection electrodes are located in the external tube. The collection electrodes are in a downstream position relative to the discharge electrodes according to the direction of the travel of the air in the channel. The discharge electrodes are connected to a high working voltage. Some of the collection electrodes are connected to a relatively low voltage of the same polarity. The remaining ones of the collection electrodes are connected to the ground. When the air travels in the channel, the discharge electrodes charge particles mixed in the air, and the collection electrodes attract the charged particles, thereby cleaning the air, without substantially increasing the concentration of ozone. However, it is sort of troublesome to assemble the electrostatic precipitator because of the considerable number of the elements.

The present invention is therefore intended to obviate or at least alleviate the problems encountered in prior art.

SUMMARY OF INVENTION

It is the primary objective of the present invention to provide a modularized electrostatic-precipitator air cleaner.

To achieve the foregoing objective, the electrostatic-precipitator air cleaner includes a base, a shell, a barrel, a high-voltage discharge module, a distribution module and a precipitation module. The shell is connected to the base and includes at least one air entrance in a lower portion. The barrel is inserted in the shell above the base and in communication with the air entrance. The high-voltage discharge module is connected to the base and inserted in the barrel. The distribution module is connected to the high-voltage discharge module. The precipitation module is inserted in the barrel and includes concentric collection electrodes, an upper frame, a lower frame and a rod. The concentric collection electrodes are electrically coupled to the distribution module. Each of the collection electrodes includes a lower edge. The collection electrodes are divided into a first group and a second group so that the collection electrodes in the first group are alternate with the collection electrodes in the second group. Each of the upper and lower frames includes a central portion and radial portions extending from the central portion. Each of the radial portions of the upper frame includes cutouts for receiving upper edges of the collection electrodes. Each of the radial portions of the lower frame includes cutouts for receiving the lower edges of the collection electrodes. The rod includes a knob formed at an upper end and a lower end connected to the central portion of the lower frame. The rod extends through the central portions of the upper and lower frames.

In an aspect, the base includes a socket formed on the central portion. The high-voltage discharge module includes a wind-shielding ring, a lower electrode holder and an upper electrode holder. The wind-shielding ring is connected to the socket and includes wind shields. The lower electrode holder is supported on the wind-shielding ring. The upper electrode holder is supported on the lower electrode holder. The discharge electrodes are located between the lower and upper electrode holders corresponding to the wind shields.

In another aspect, the wind-shielding ring includes hooks, and the socket includes lugs engaged with the hooks.

In another aspect, the distribution module includes a distribution bracket, high-voltage electrodes, ground electrodes and a holding bracket. The distribution bracket includes radial portions inserted in the radial portions of the lower frame. Each of the radial portions of the distribution bracket includes slits for receiving the lower edges of the collection electrodes. The high-voltage electrodes are in contact with the collection electrodes in the first group. Each of the high-voltage electrodes is connected to one of the radial portions of the distribution bracket. The ground electrodes are in contact with the collection electrodes in the second group. Each of the ground electrodes is connected to one of the radial portions of the distribution bracket so that the ground electrodes are alternate with the high-voltage electrodes. The holding bracket is connected to the distribution bracket and the upper electrode holder.

In another aspect, each of the high-voltage electrodes includes a high-voltage electrode plate and conductive springs in contact with the high-voltage electrode plate. Each of the ground electrodes includes a ground electrode plate and ground springs in contact with the ground electrode plate. The conductive springs and the ground springs are in contact with the lower edges of the collection electrodes inserted in the slits of the radial portions of the distribution bracket.

In another aspect, the electrostatic-precipitator air cleaner further includes a fan connected to an upper portion of the shell.

In another aspect, the electrostatic-precipitator air cleaner further includes a hinge for pivotally connecting the fan to the shell and an elastic locking assembly for locking the fan to the shell.

In another aspect, the base includes cavities. The shell includes a front piece and a rear piece. The front piece includes feet inserted in some of the cavities. The rear piece includes feet inserted in the remaining ones of the cavities of the base.

In another aspect, the barrel is connected to the rear piece.

In another aspect, the barrel includes guiding grooves in an internal face, and each of the radial portions of the upper and lower frames includes a free end movable along the guiding grooves of the barrel to guide the precipitation module into or from the barrel.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
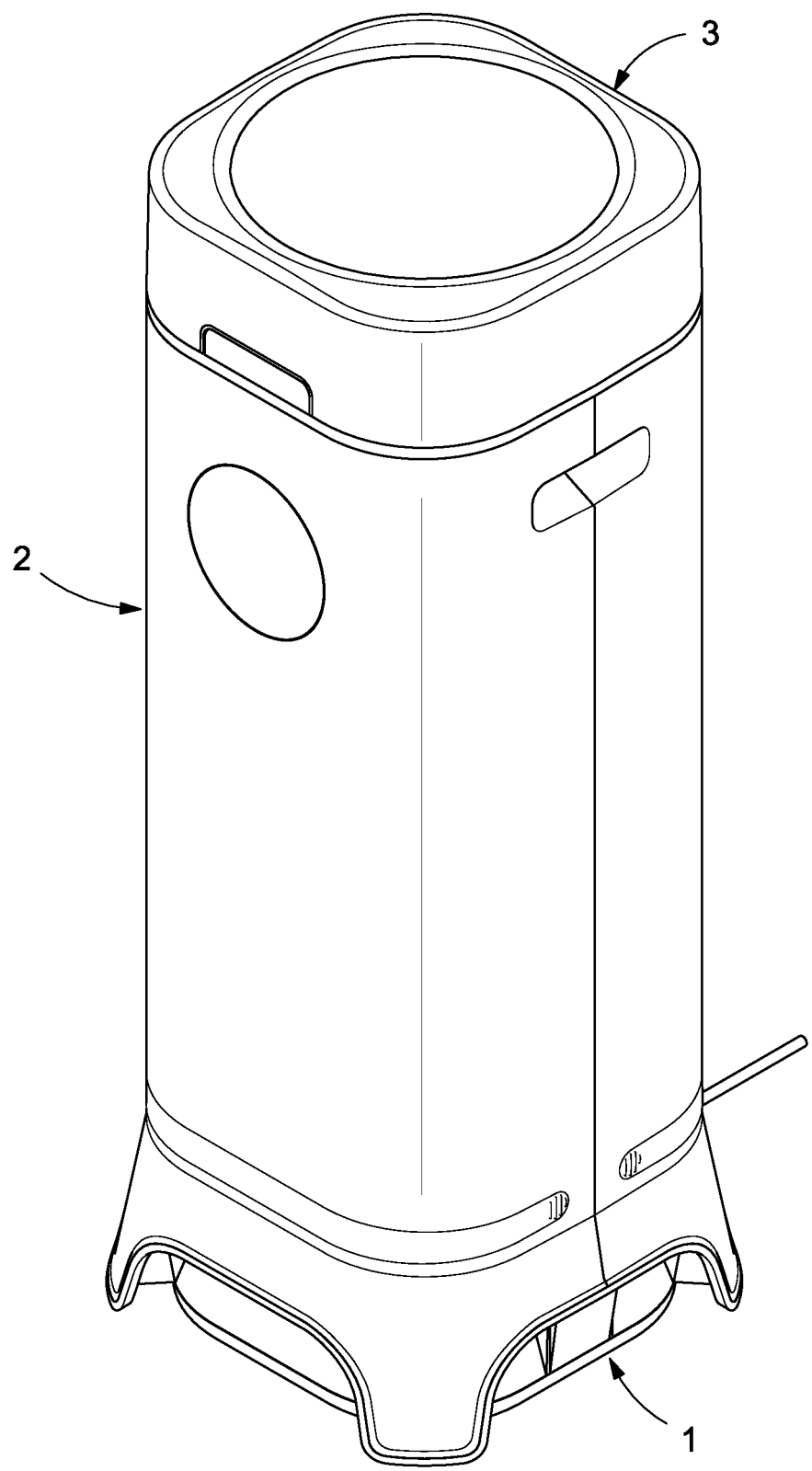
FIG. 1 is a perspective view of an electrostatic-precipitator air cleaner according to the preferred embodiment of the present invention.

Referring to FIG. 1, an electrostatic-precipitator air cleaner includes a base 1, a shell 2 connected to the base 1, and a fan 3 connected to an upper end of the shell 2 according to the preferred embodiment of the present invention.

Figure 2:
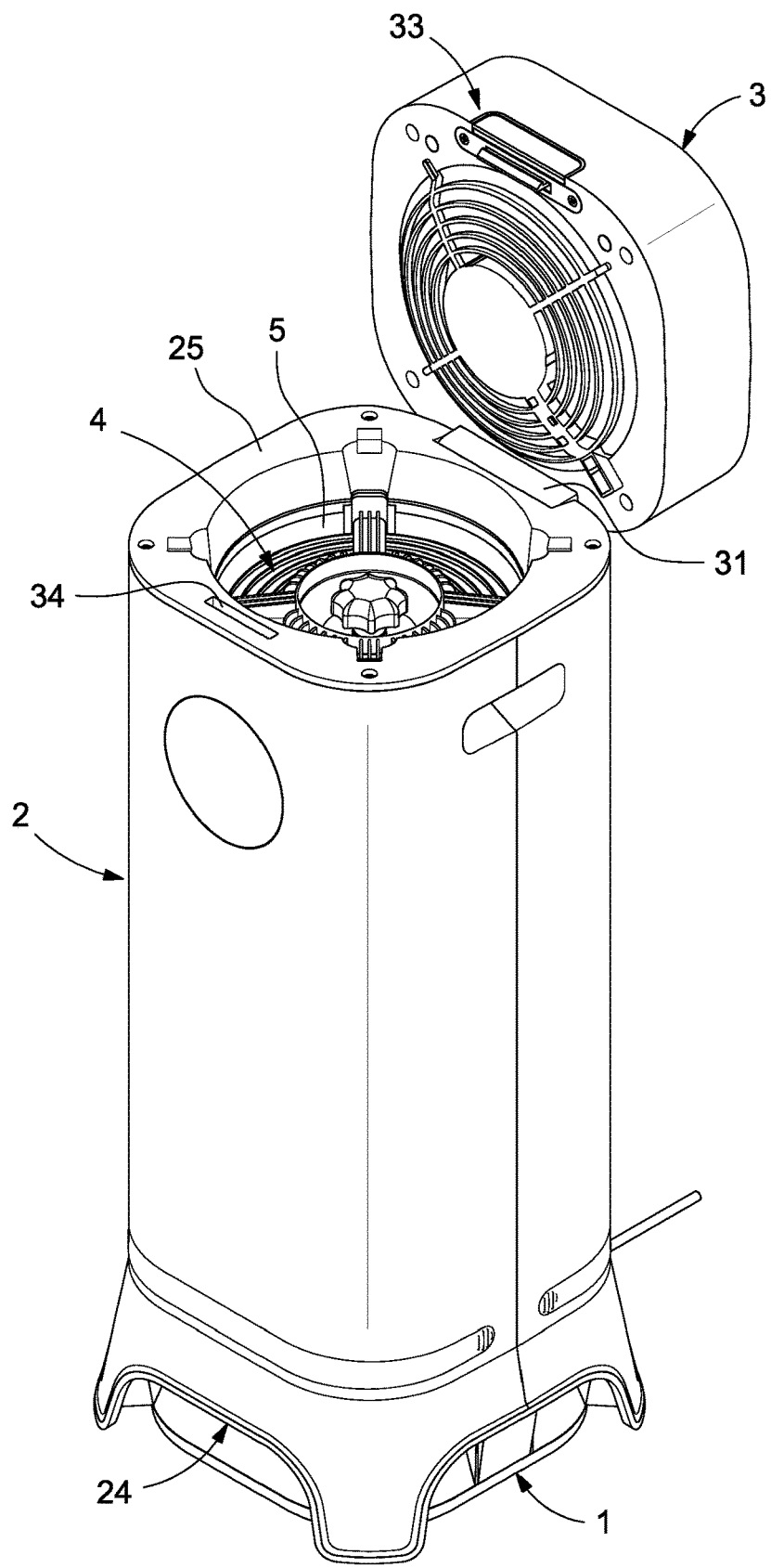
FIG. 2 is a perspective view of the electrostatic-precipitator air cleaner in another position than shown in FIG. 1.

Referring to FIG. 2, the fan 3 is pivotally connected to the upper end of the shell 2 by a hinge 31. The fan 3 can be locked to the upper end of the shell 2 by an elastic locking assembly. The elastic locking assembly includes an elastic hook 33 connected to the fan 3 and a slot 34 made in a panel 25 connected to the upper end of the shell 2. The fan 3 can be pressed to release the elastic hook 33 from the slot 34 to allow the fan 3 to be pivoted from the shell 2 about the hinge 31. With the fan 3 pivoted from the shell 2, access to a barrel 5 and a precipitation module 4 is allowed.

Figure 3:
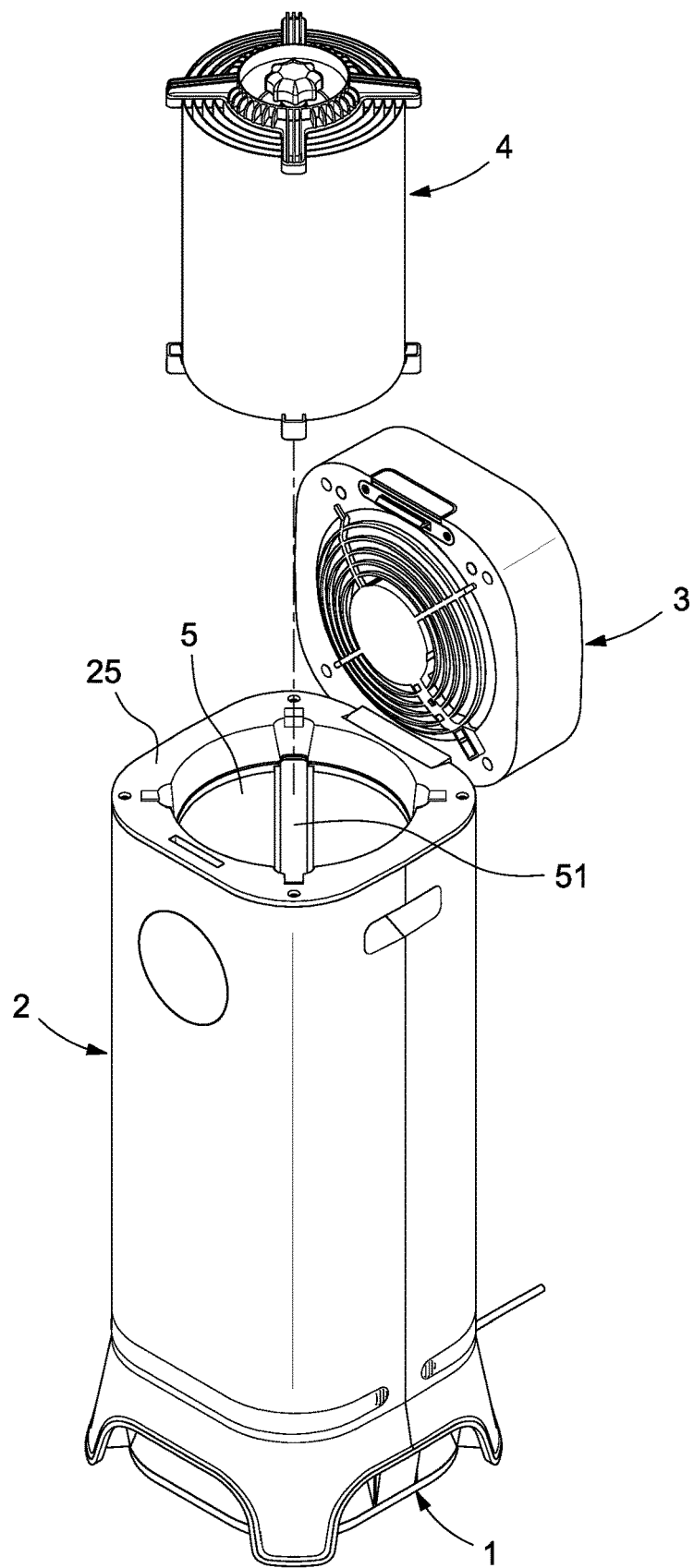
FIG. 3 is a perspective view of a precipitation module detached from the electrostatic-precipitator air cleaner shown in FIG. 2.

Referring to FIG. 3, the precipitation module 4 can be removed from the shell 2, cleaned and inserted in the shell 2 again by a user.

Figure 4:
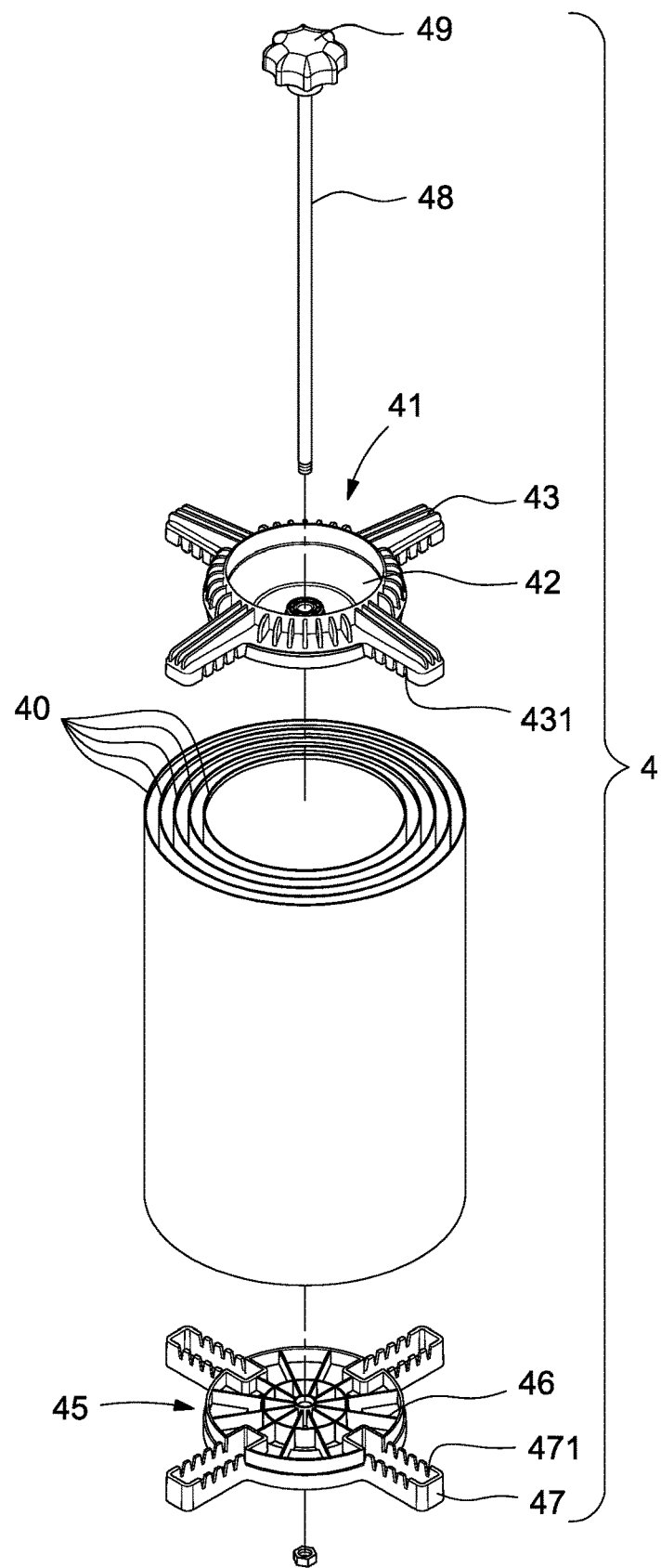
FIG. 4 is an exploded view of the precipitation module shown in FIG. 3.
Figure 5:
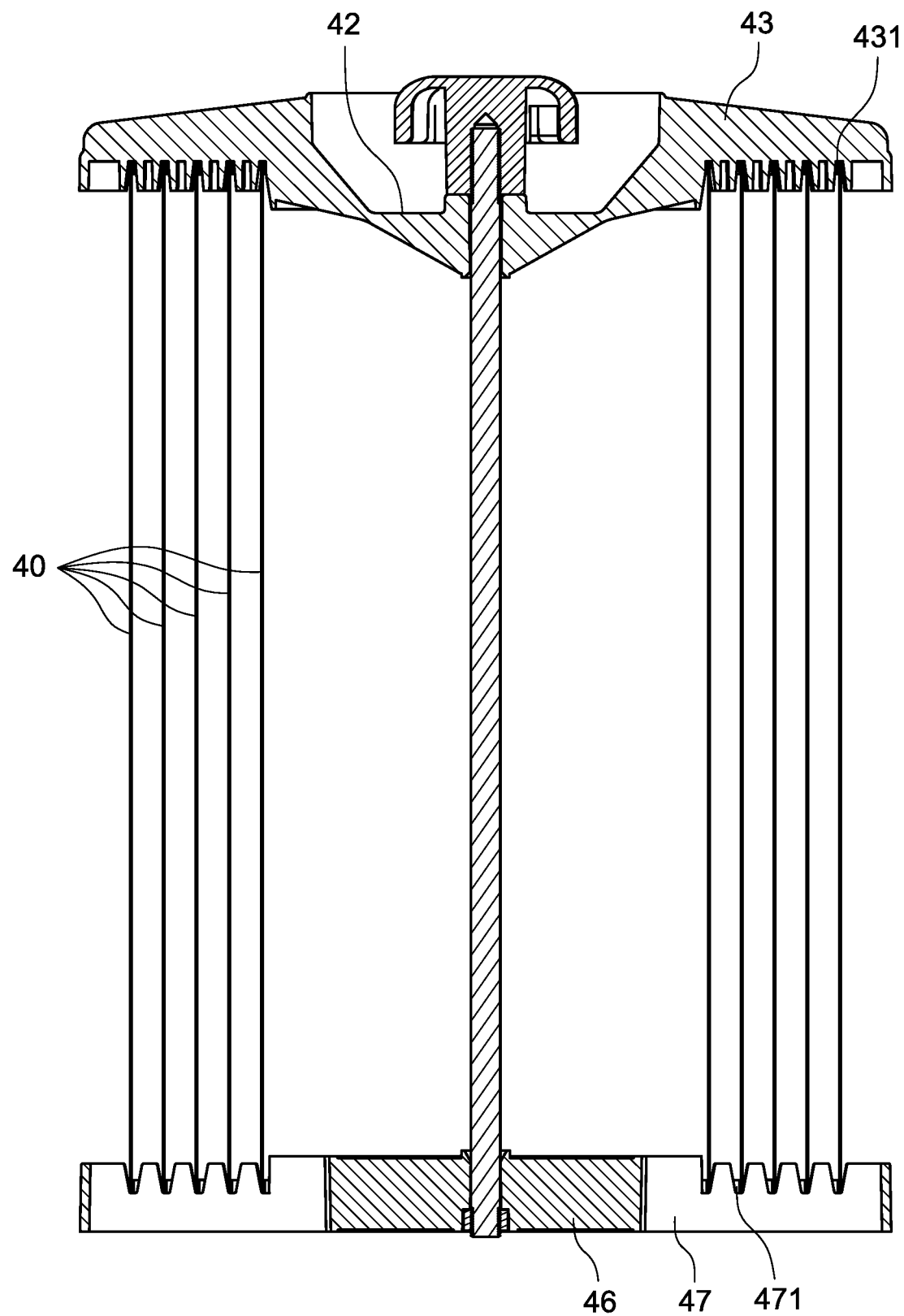
FIG. 5 is a cross-sectional view of the precipitation module shown in FIG. 4.

Referring to FIGS. 3 through 5, the precipitation module 4 includes several concentric cylindrical collection electrodes 40. Each of the collection electrodes 40 includes an upper edge connected to an upper frame 41 and a lower edge connected to a lower frame 45. There is a channel (not numbered) between every two adjacent ones of the collection electrodes 40. Air can travel in the channels. The upper frame 41 includes several radial portions 43 extending from a central portion 42. The lower frame 45 includes several radial portions 47 extending from a central portion 46. Each of the radial portions 43 of the upper frame 41 includes cutouts 431 for receiving the upper edges of the collection electrodes 40. Each of the radial portions 47 of the lower frame 45 includes cutouts 451 for receiving the lower edges of the collection electrodes 40. A rod 48 includes a knob or handle 49 formed at an upper end and a thread (not numbered) formed at a lower section. The rod 48 is inserted in the central portions 42 and 46 of the upper and lower frames 41 and 45. The thread of the rod 48 is engaged with a nut (not numbered) so that the precipitation module 4 is assembled. The user can hold the knob or handle 49 to move the precipitation module 4 into or from the shell 2.

Referring to FIG. 3, there is a barrel 5 inserted in the shell 2. The barrel 5 is used to contain the precipitation module 4. The barrel 5 includes several guiding grooves 51 in an internal face. The panel 25 includes guiding recesses (not numbered) corresponding to the guiding grooves 51. Free ends of the radial portions 43 and 47 of the upper and lower frames 41 and 45 are moved in and along the guiding recesses and the guiding grooves 51 so that the precipitation module 4 is inserted into or from the barrel 5 smoothly and precisely. The precipitation module 4 is not rotatable in the barrel 5 because the free ends of the radial portions 43 and 47 of the upper and lower frames 41 and 45 are inserted in the guiding grooves 51. The guiding grooves 51 precisely position the precipitation module 4 in the barrel 5 so that the precipitation module 4 is electrically coupled to a distribution module 7 supported on the base 1 with precision.

Figure 6:
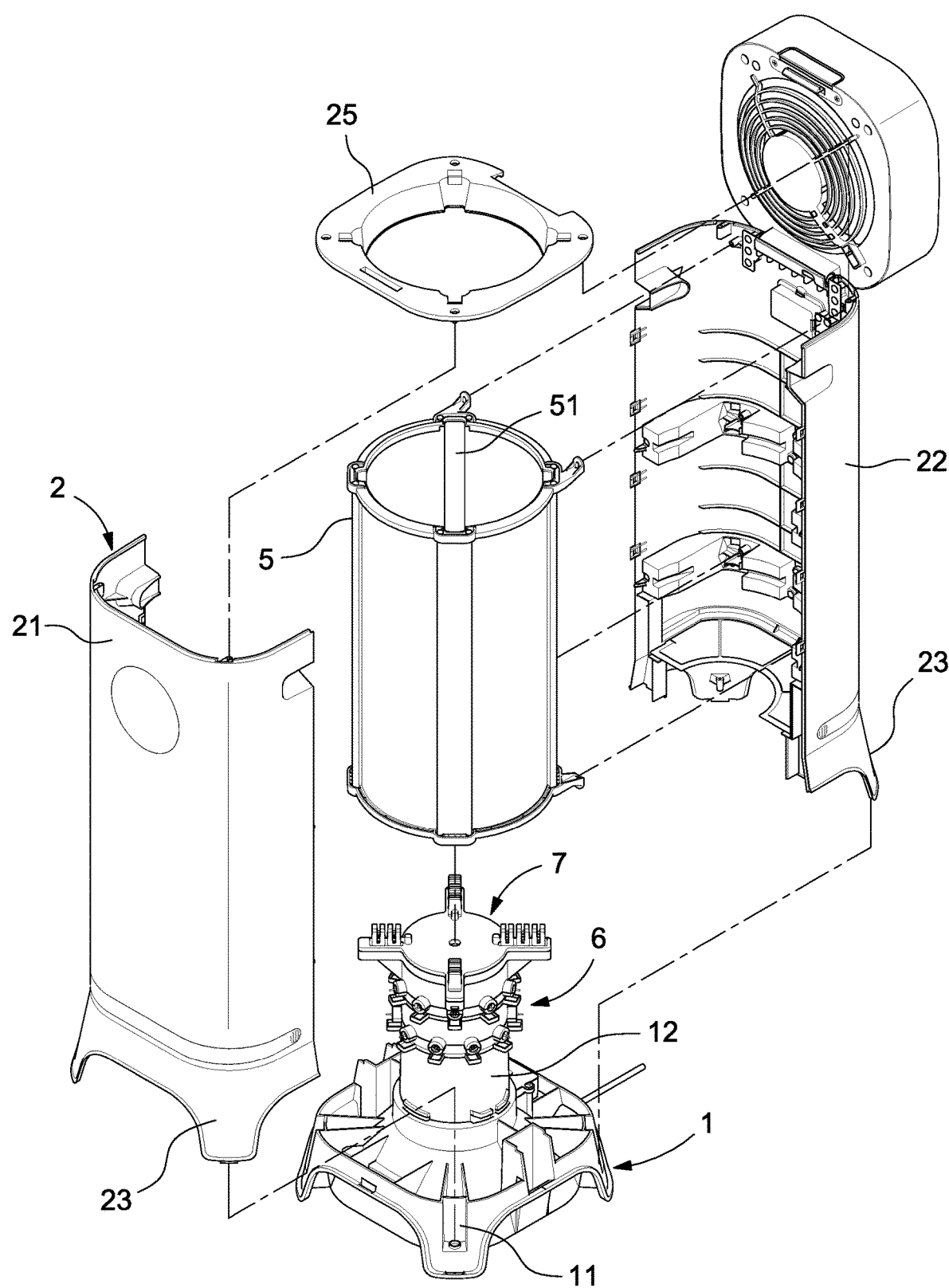
FIG. 6 is an exploded view of the electrostatic precipitator air cleaner shown in FIG. 2.

Referring to FIG. 6, the barrel 5 includes an upper open end and a lower open end. The shell 2 includes a front piece 21 and a rear piece 22. Each of the front and rear pieces 21 and 22 includes several feet 23 inserted in several cavities 11 made in the base 1. The feet 23 are connected to the base 1. The barrel 5 is inserted in a space between the front piece 21 and the rear piece 22. The barrel 5 is connected to the rear piece 22. The panel 25 is connected to an upper edge of the front piece 21 and an upper edge of the rear piece 22.

Figure 7:
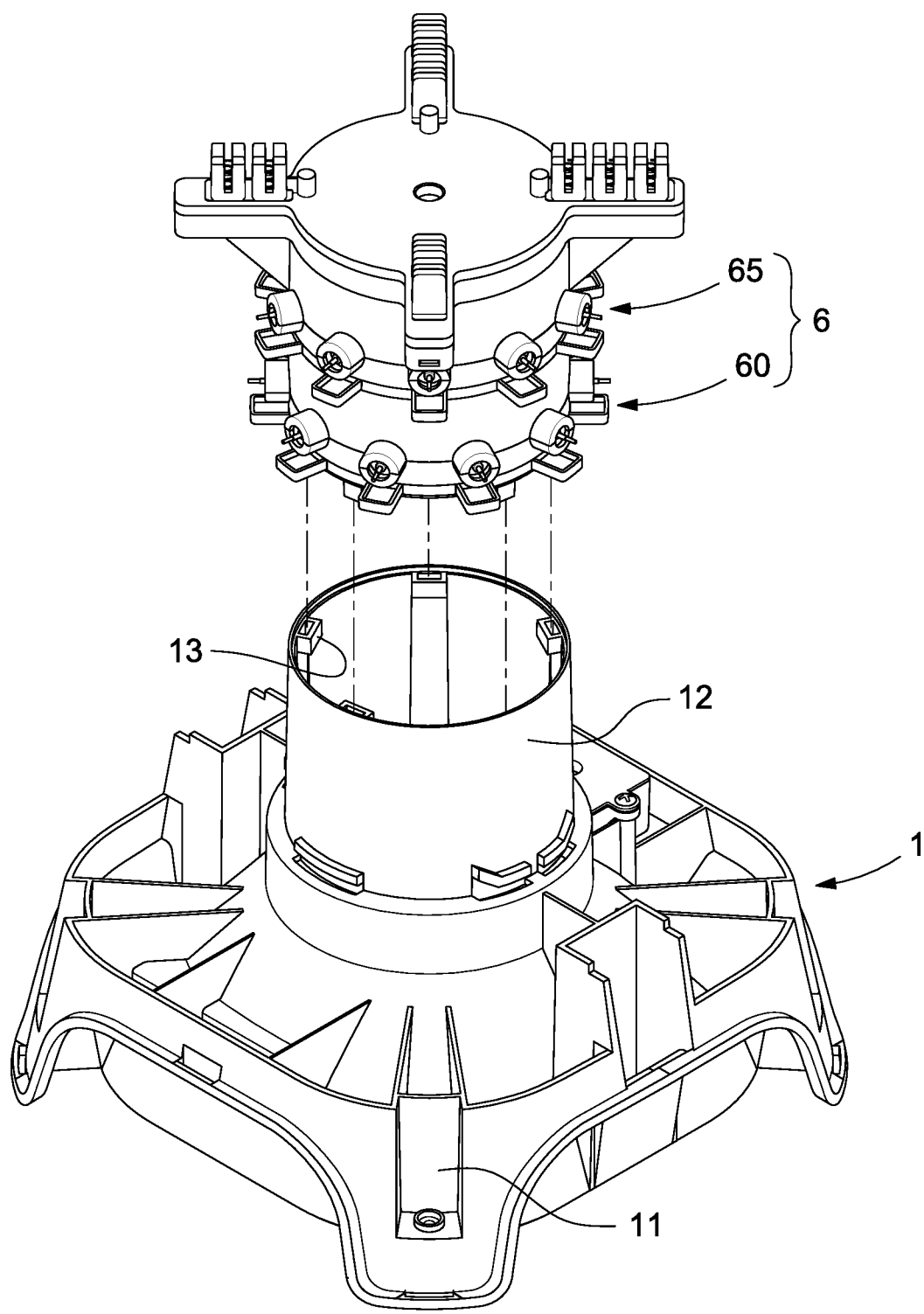
FIG. 7 is an enlarged view of a base and a high-voltage discharge module of the electrostatic-precipitator air cleaner shown in FIG. 6.
Figure 8:
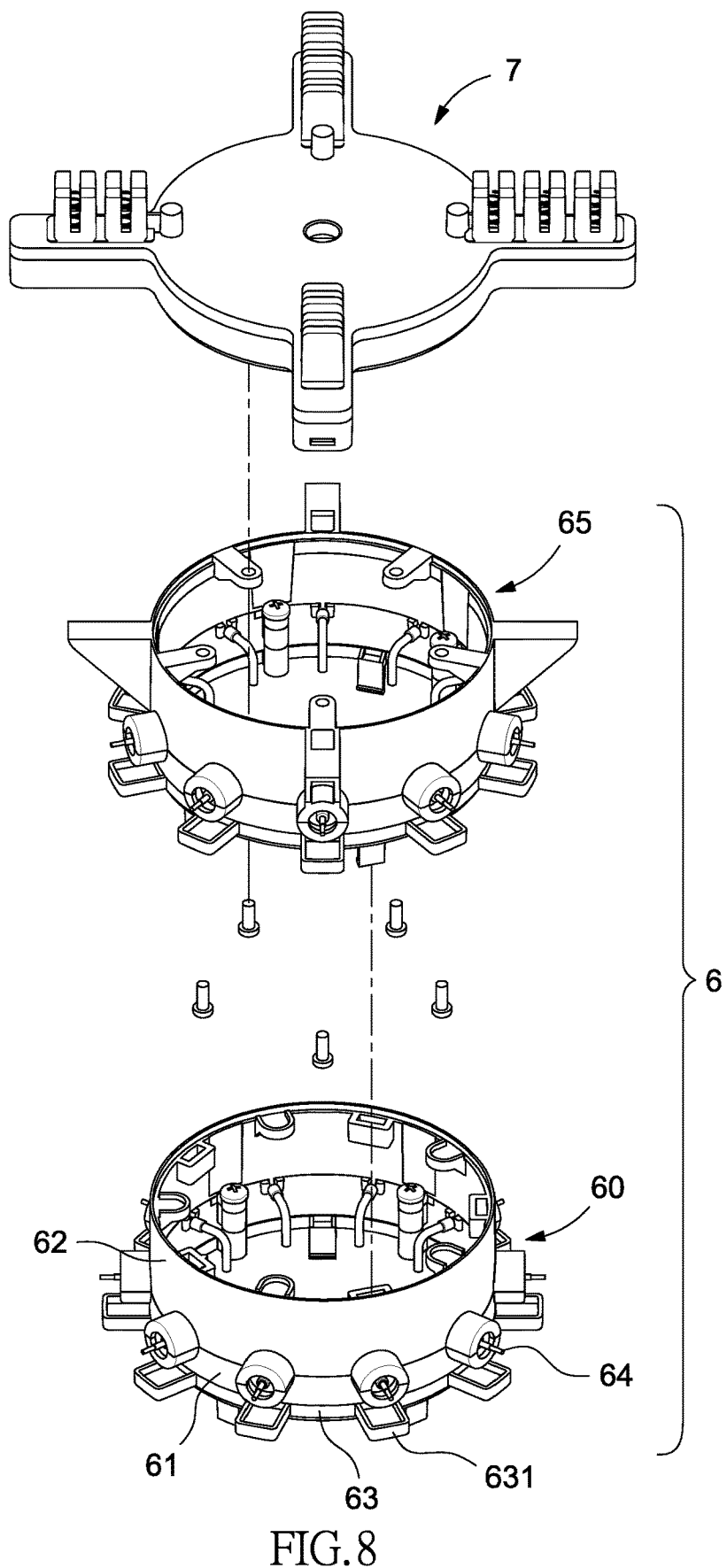
FIG. 8 is an exploded view of the high-voltage discharge module shown in FIG. 7.

Referring to FIGS. 6 and 7, a socket 12 is formed on a central portion of the base 1. A high-voltage discharge module 6 is connected to the socket 12. A distribution module 7 is connected to the high-voltage discharge module 6. The high-voltage discharge module 6 and the distribution module 7 are inserted in the barrel 5.

Referring to FIGS. 7, 8, 9, 10 and 13, the high-voltage discharge module 6 includes at least one high-voltage discharger array. For example, the high-voltage discharge module 6 includes a first high-voltage discharger array 60 and a second high-voltage discharger array 65. The second high-voltage discharger array 65 is identical to the first high-voltage discharger array 60. However, the high-voltage discharger arrays are given different reference numbers for convenience of the description.

Figure 9:
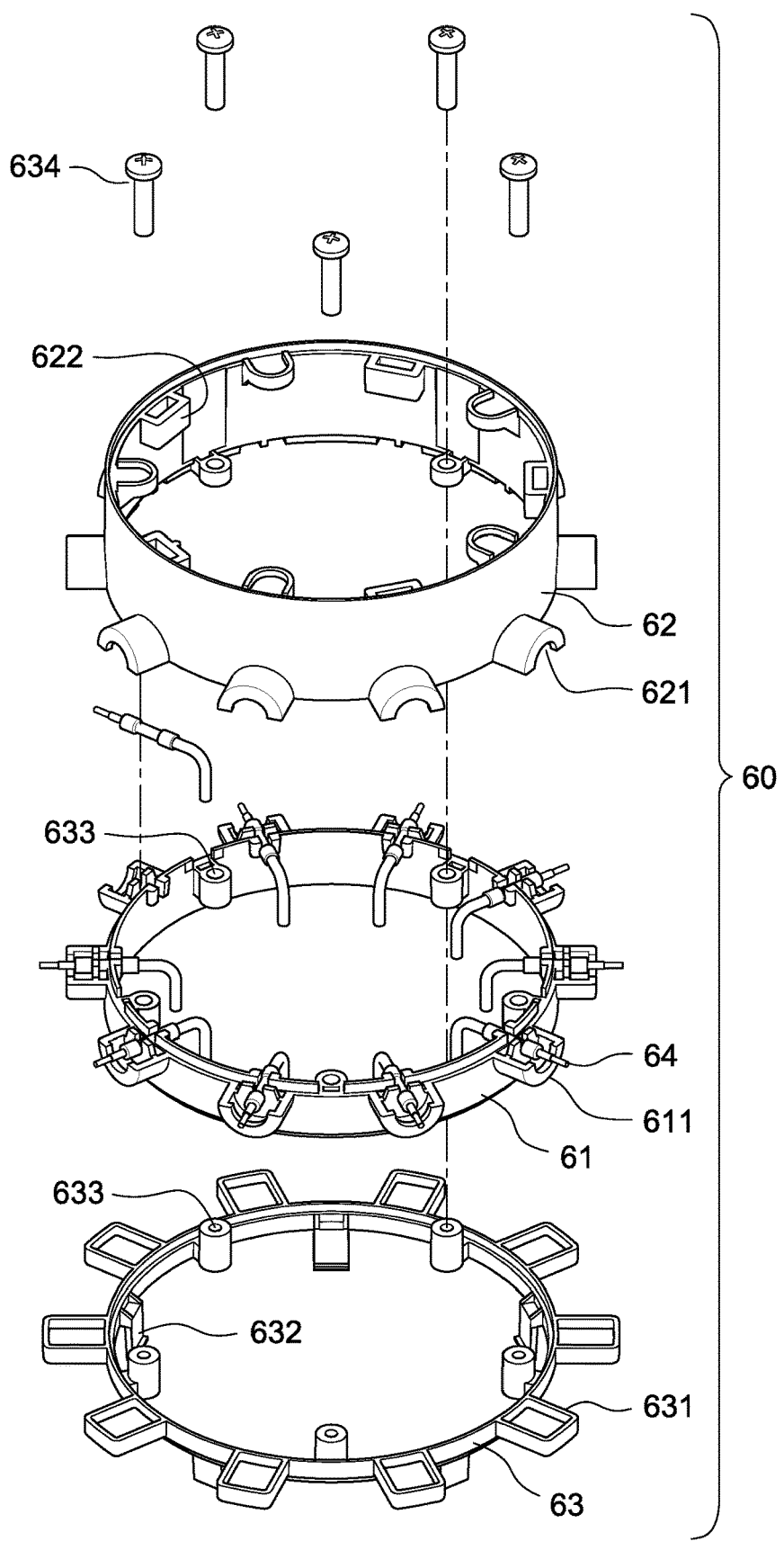
FIG. 9 is an exploded view of a first high-voltage discharger array of the high-voltage discharge module shown in FIG. 8.

Referring to FIG. 9, the first high-voltage discharger array 60 includes a lower electrode holder 66, an upper electrode holder 67, a wind-shielding ring 68, screw holes 683, screws 684, lower arched strips 661, upper arched strips 671, discharge electrodes 69, wind shields 681 and hooks 682. The lower electrode holder 61, the upper electrode holder 62 and the wind-shielding ring 63 are concentric. The upper electrode holder 62 is connected to an upper face of the lower electrode holder 61. The wind-shielding ring 63 is connected to a lower face of the lower electrode holder 61. Each of the lower electrode holder 61, the upper electrode holder 62 and the wind-shielding ring 63 includes near an internal face several screw holes 633 for receiving several screws 634, thereby joining the lower electrode holder 61, the upper electrode holder 62 and the wind-shielding ring 63. The lower electrode holder 61 includes several lower arched strips 611 formed on an external face. The upper electrode holder 63 includes several upper arched strips 621 formed on an external face. The lower electrode holder 61 is connected to the upper electrode holder 62 so that each of the lower arched strips 611 and a corresponding one of the upper arched strips 621 together form an annular element (not numbered) for receiving a corresponding one of the discharge electrodes 64. The wind-shielding ring 63 includes wind shields 631 corresponding to the discharge electrodes 64. The wind-shielding ring 63 further includes several hooks 632 for engagement with several lugs 13 formed on an internal face of the socket 12 (FIG. 7), thereby connecting the high-voltage discharge module 6 to the socket 12.

Figure 10:
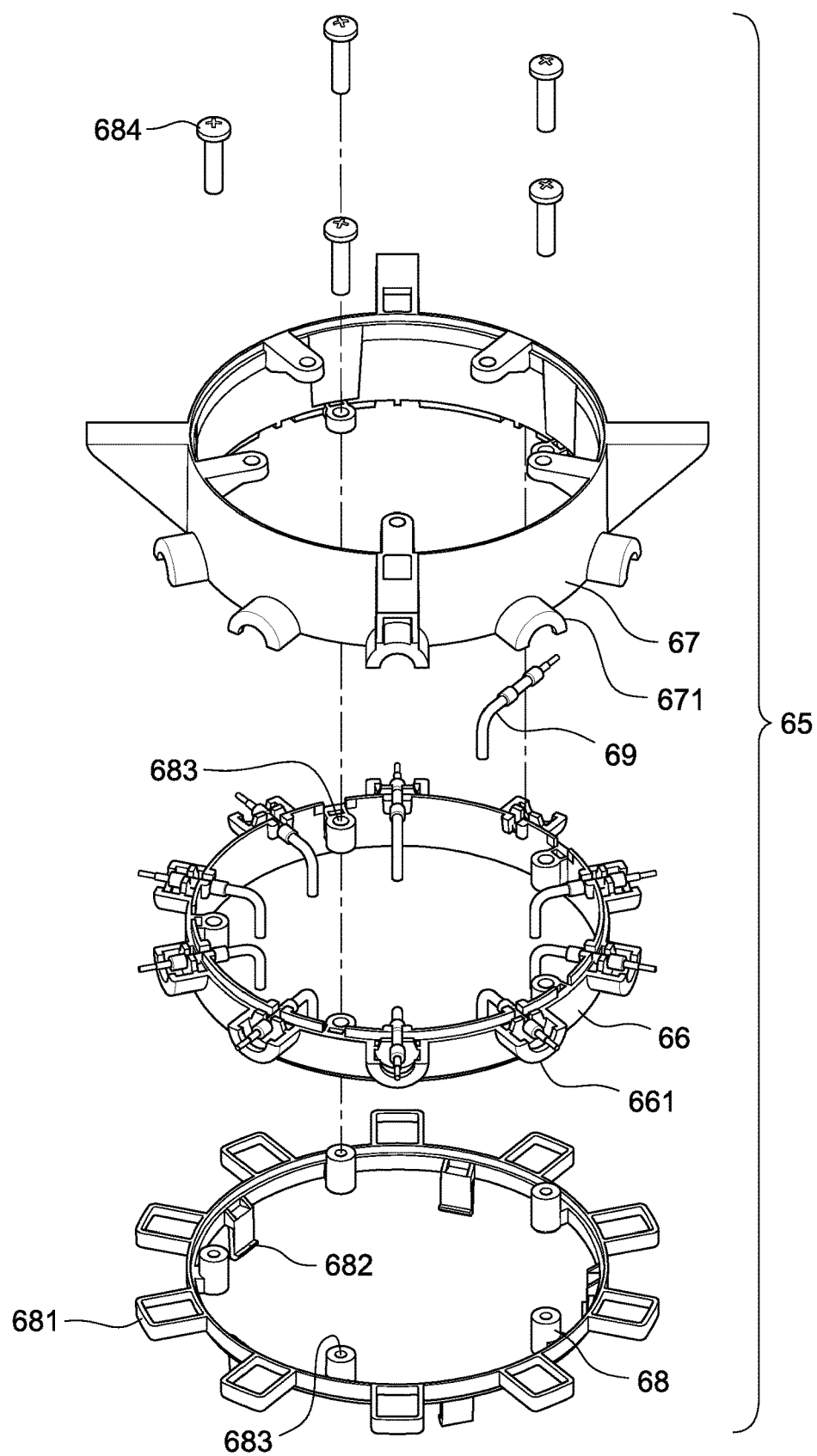
FIG. 10 is an exploded view of a second high-voltage discharger array of the high-voltage discharge module shown in FIG. 8.

Referring to FIG. 10, similarly, the second high-voltage discharger array 65 includes a lower electrode holder 66, an upper electrode holder 67, a wind-shielding ring 68, screw holes 683, screws 684, lower arched strips 661, upper arched strips 671, discharge electrodes 69, wind shields 681 and hooks 682. The hooks 682 of the second high-voltage discharger array 65 are engaged with the lugs 622 of the first high-voltage discharger array 60, thereby connecting the second high-voltage discharger array 65 to the first high-voltage discharger array 60. Moreover, the discharge electrodes 64 of the first high-voltage discharger array 60 are alternate with the discharge electrodes 69 of the second high-voltage discharger array 65 (FIG. 7).

Figure 11:
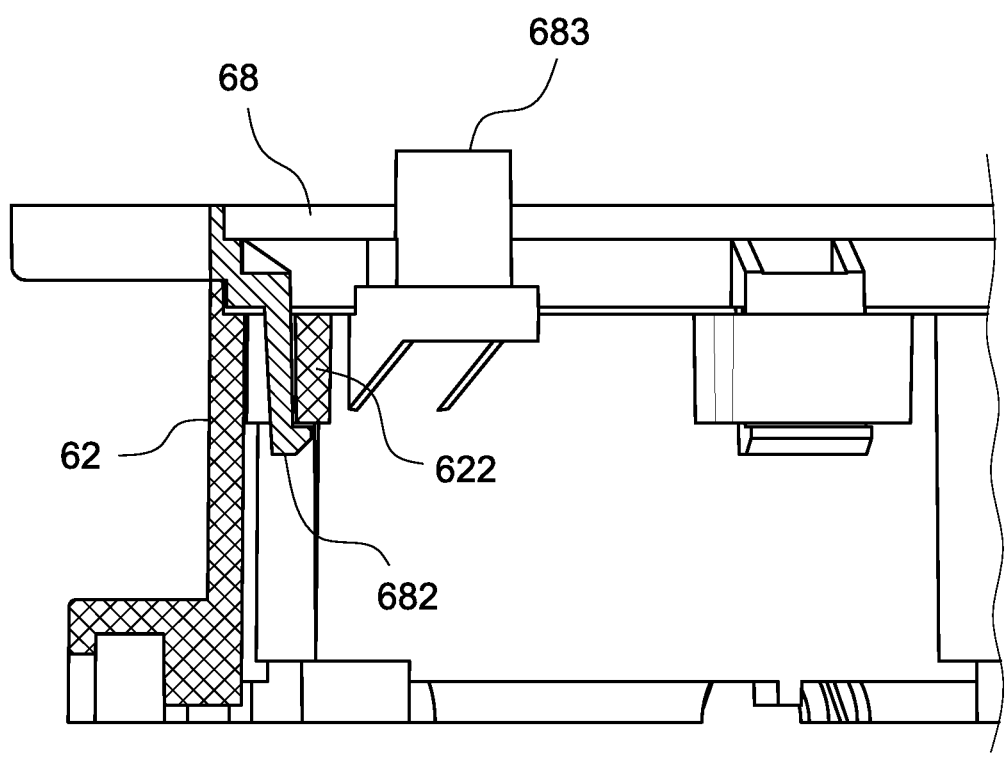
FIG. 11 is an enlarged partial view of the high-voltage discharge module shown in FIG. 8.

Referring to FIG. 11, the engagement of the hooks 682 of the second high-voltage discharger array 65 with the lugs 622 of the first high-voltage discharger array 60 is shown for example. The hooks 632 of the first high-voltage discharger array 60 are engaged with the lugs 13 of the socket 12 similarly.

Figure 12:
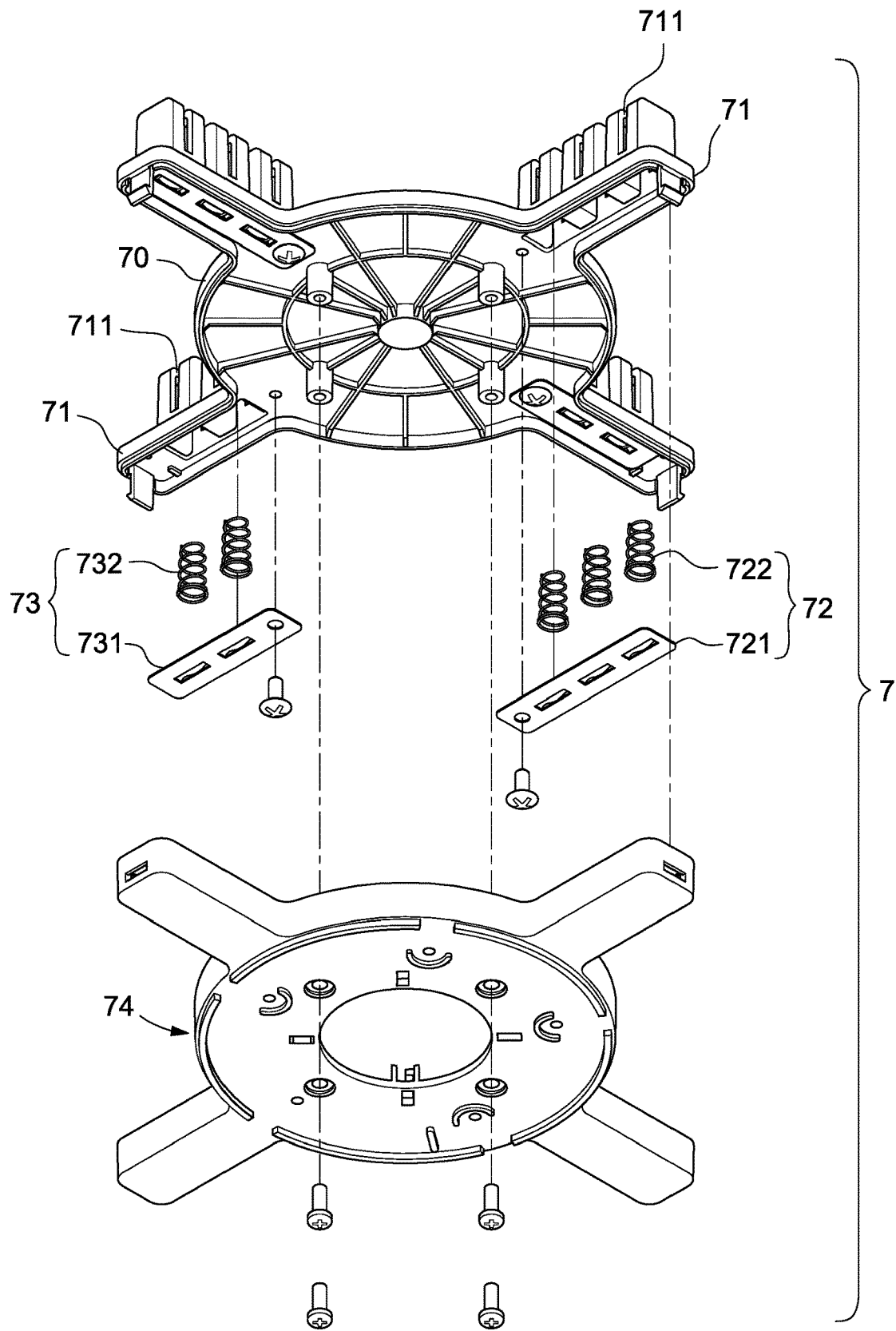
FIG. 12 is an exploded view of a distribution bracket of the high-voltage discharge module shown in FIG. 7.
Figure 13:
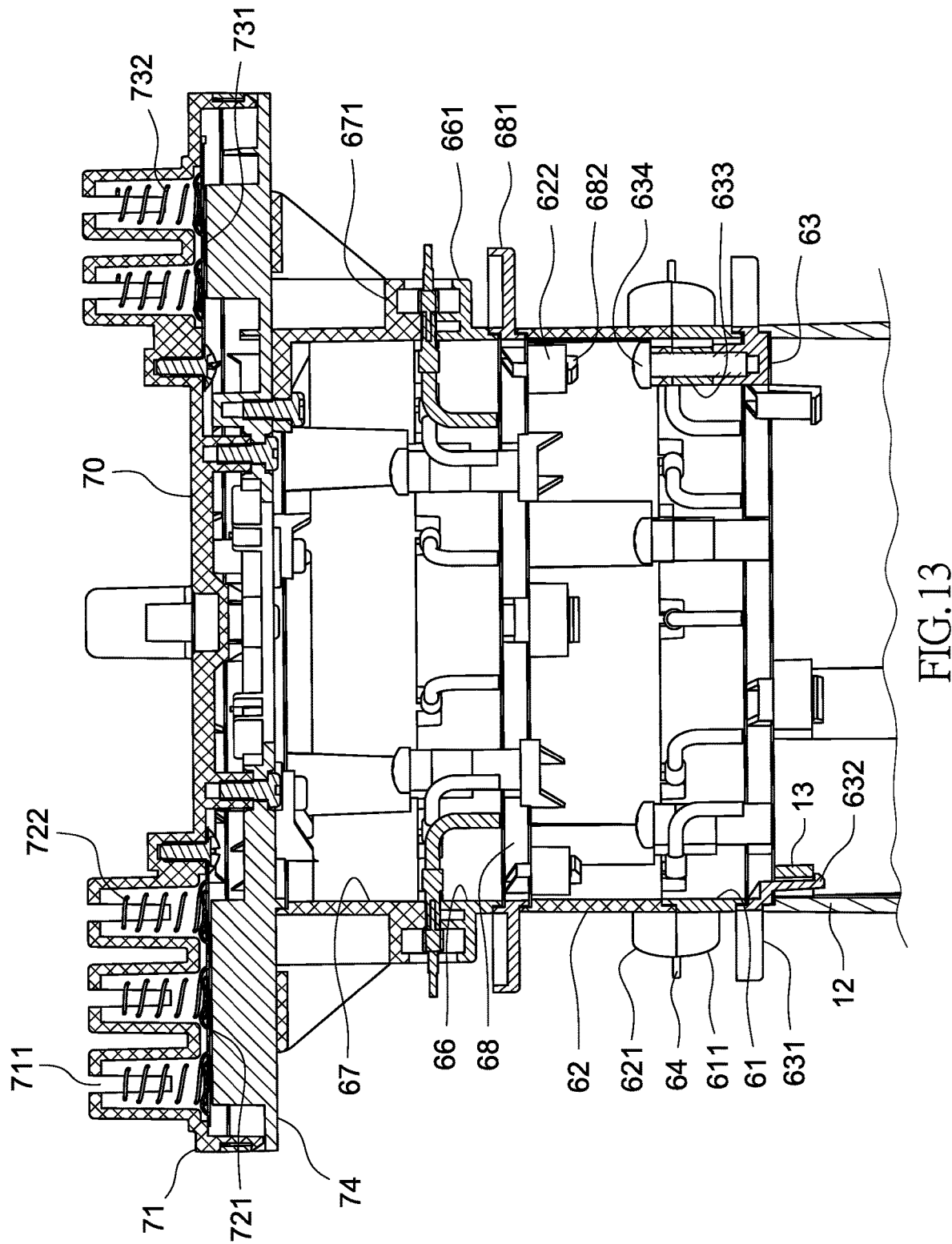
FIG. 13 is a cross-sectional view of the high-voltage discharge module shown in FIG. 7.

Referring to FIGS. 12 and 13, the distribution module 7 includes a distribution bracket 70 and a holding bracket 74. The distribution bracket 70 includes several radial portions 71 for receiving the radial portions 47 of the lower frame 45. Each of the radial portions 71 includes slits 711.

Two high-voltage electrodes 72 are connected to two opposite ones of the radial portions 71. Each of the high-voltage electrodes 72 includes a high-voltage electrode plate 721 in contact with several conductive springs 722. The conductive springs 722 are located corresponding to the slits 711.

Two ground electrodes 73 are connected to the remaining ones of the radial portions 71. Each of the ground electrodes 73 includes a ground electrode plate 731 in contact with several ground springs 732. The ground springs 732 are located corresponding to the slits 711.

The holding bracket 74 is connected to a lower portion of the distribution bracket 70, thereby covering the high-voltage electrodes 72 and the ground electrodes 73. Furthermore, the holding bracket 74 is connected to the upper electrode holder 67 of the second high-voltage discharger array 65.

Figure 14:
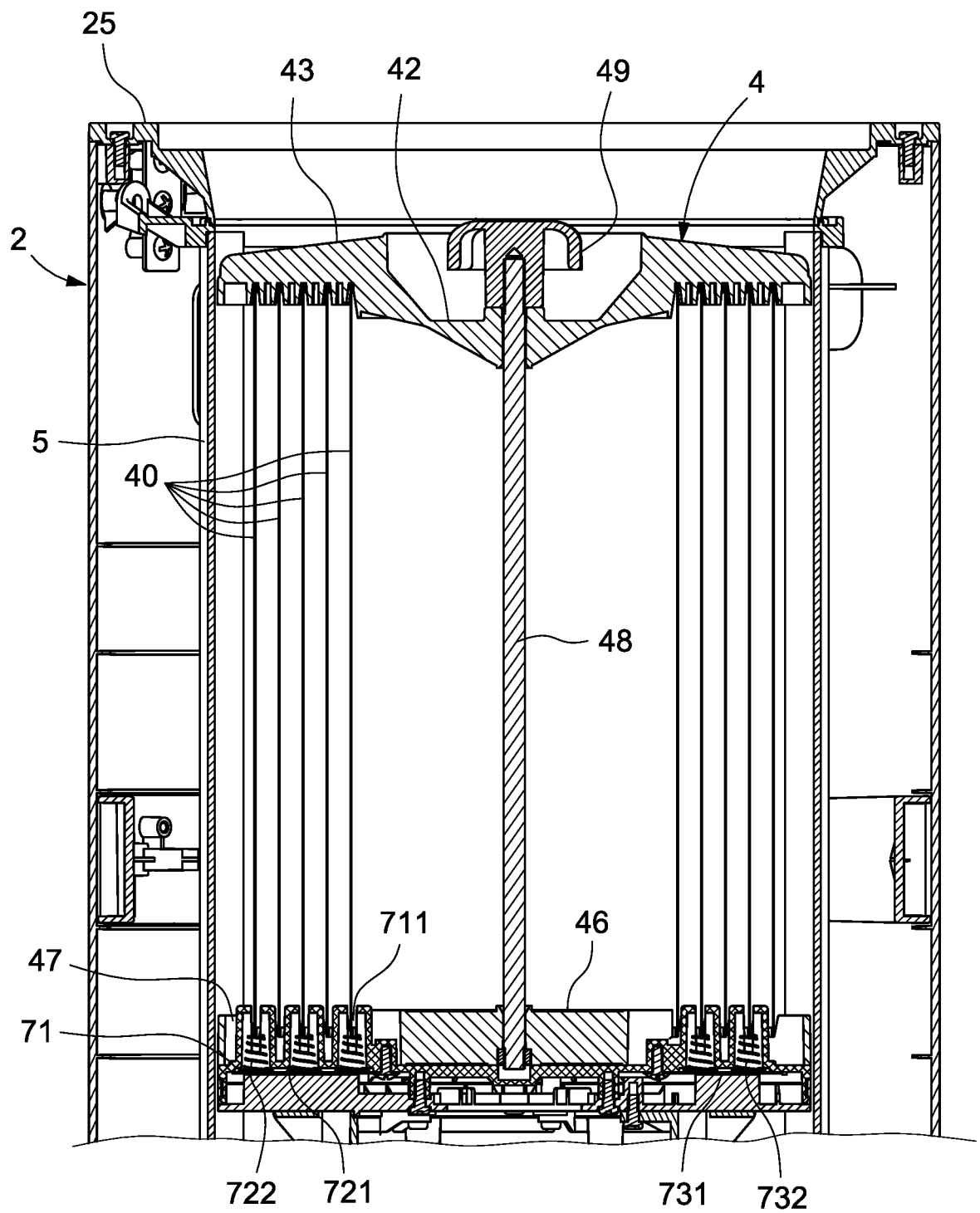
FIG. 14 is a cross-sectional view of the distribution bracket shown in FIG. 12 and the precipitation module shown in FIG. 3.
Figure 15:
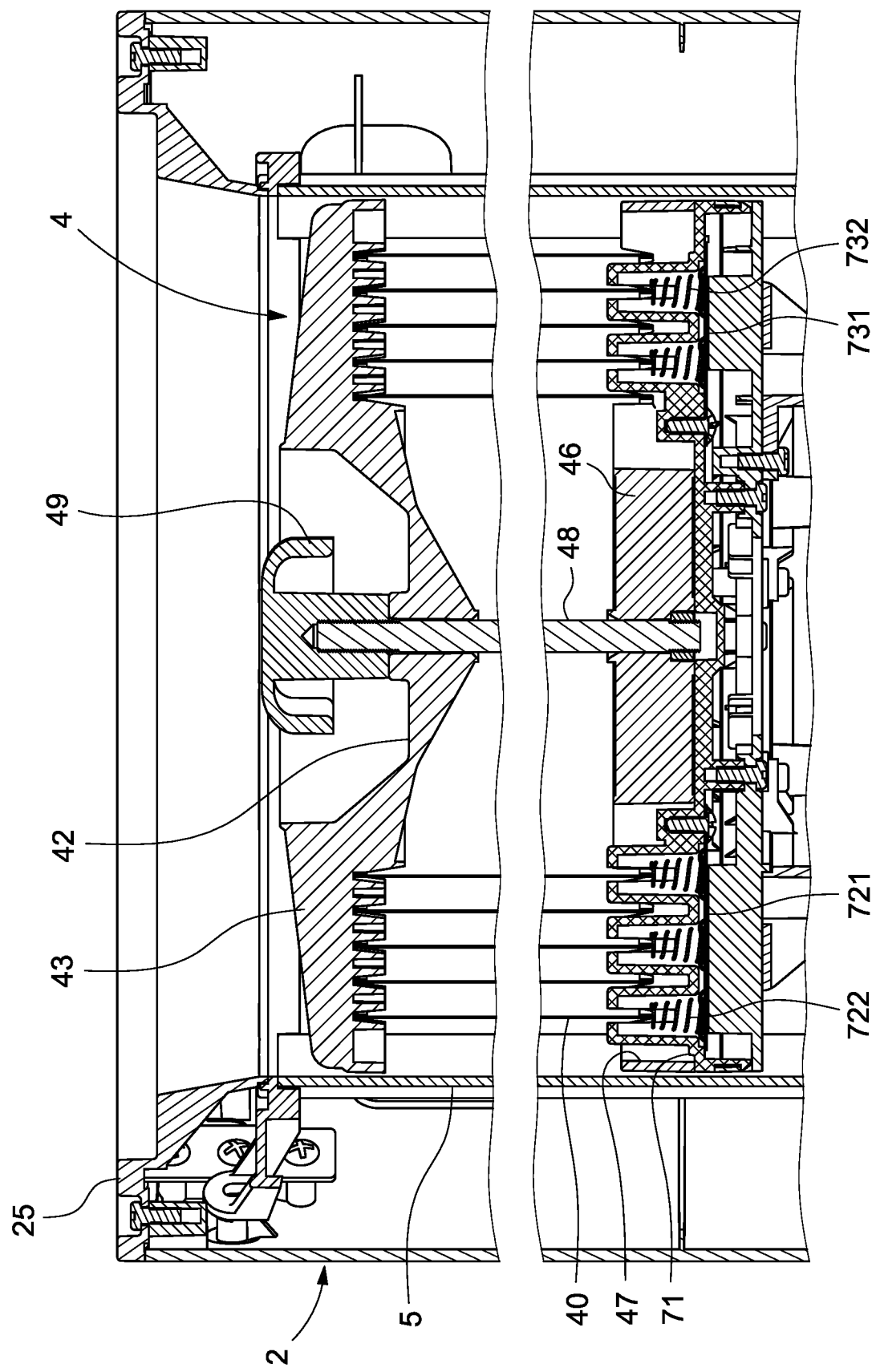
FIG. 15 is an enlarged partial view of the distribution bracket shown in FIG. 12 and the precipitation module shown in FIG. 14.

Referring to FIGS. 14 and 15, the precipitation module 4 is located in the barrel 5. The radial portions 47 of the precipitation module 4 are located on the radial portions 71 of the distribution module 7. The collection electrodes 40 are inserted in the slits 711 of the radial portions 71. The collection electrodes 40 are divided into two groups. The collection electrodes 40 in the first group are alternate with the collection electrodes 40 in the second group. The collection electrodes 40 in the first group are in contact with the conductive springs 722. That is, each of the collection electrodes 40 in the first group is electrically coupled to a high-voltage electrode plate 721. The collection electrodes 40 in the second group are in contact with the ground springs 732. That is, each of the collection electrodes 40 in the second group is electrically coupled to a ground electrode plate 731. The conductive springs 722 and the ground springs 732 support the collection electrodes 40 as well as electrically coupled to the collection electrodes 40.

By conventional distribution technology, the discharge electrodes 64 and 69 of the high-voltage discharge module 6 are connected to a high voltage of a same polarity (such as positive) as the high-voltage electrodes 72, and the ground electrode 73 are connected to the ground. Thus, the collection electrodes 40 in the first group are at a positive high voltage. The collection electrodes 40 in the second group are at negative voltage because of the positive high voltage.

In operation of electrostatic-precipitator air cleaner, the fan 3 is actuated to draw air into the barrel 5 via an air entrance 24 made in a lower portion of the shell 2. The wind shields 681 are located below the discharge electrodes 64 and 69 to prevent particles mixed in the air from direct contact with the discharge electrodes 64. The fan 3 propels the air from the barrel 5 after the air goes over the high-voltage discharge module 6 and the precipitation module 4. The air in the barrel 5 is loaded with positive charge, and the particles mixed in the air are loaded with positive charge because of the discharge electrodes 64. The particles loaded with the positive charge are attracted to the collection electrodes 40 in the second group (with negative charge) that are grounded. Hence, the air is cleaned when it is released from the barrel 5 by the fan 3.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. An electrostatic-precipitator air cleaner comprising:
   a base;
   a shell connected to the base and comprising at least one air entrance in a lower portion;
   a barrel inserted in the shell above the base and in communication with the at least one air entrance;
   a high-voltage discharge module connected to the base and inserted in the barrel;
   a distribution module connected to the high-voltage discharge module; and
   a precipitation module inserted in the barrel and comprising:
      concentric collection electrodes electrically coupled to the distribution module, wherein each of the collection electrodes comprises a lower edge, and the collection electrodes are divided into a first group and a second group so that the collection electrodes in the first group alternate with the collection electrodes in the second group;
      an upper frame comprising a central portion and radial portions extending from the central portion, wherein each of the radial portions of the upper frame comprises cutouts for receiving upper edges of the collection electrodes;
      a lower frame comprising a central portion and radial portions extending from the central portion, wherein each of the radial portions of the lower frame comprises cutouts for receiving the lower edges of the collection electrodes; and a rod extending through the central portions of the upper and lower frames and comprising a knob formed at an upper end and a lower end connected to the central portion of the lower frames.

2. The electrostatic-precipitator air cleaner according to claim 1, wherein the base comprises a socket formed on a central portion of the base, and the high-voltage discharge module comprises:
   a wind-shielding ring connected to the socket, the wind-shielding ring comprising wind shields;
   a lower electrode holder supported on the wind-shielding ring; and
   an upper electrode holder supported on the lower electrode holder; and
   discharge electrodes located between the lower and upper electrode holders corresponding to the wind shields.

3. The electrostatic-precipitator air cleaner according to claim 2, wherein the wind-shielding ring comprises hooks, and the socket comprises lugs engaged with the hooks.

4. The electrostatic-precipitator air cleaner according to claim 2, wherein the distribution module comprises:
   a distribution bracket comprising radial portions inserted in the radial portions of the lower frame, wherein each of the radial portions of the distribution bracket comprises slits for receiving the lower edges of the collection electrodes;
   high-voltage electrodes in contact with the collection electrodes in the first group, wherein each of the high-voltage electrodes is connected to one of the radial portions of the distribution bracket;
   ground electrodes in contact with the collection electrodes in the second group, wherein each of the ground electrodes is connected to one of the radial portions of the distribution bracket so that the ground electrodes alternate with the high-voltage electrodes; and
   a holding bracket connected to the distribution bracket and the upper electrode holder.

5. The electrostatic-precipitator air cleaner according to claim 4, wherein each of the high-voltage electrodes comprises a high-voltage electrode plate and conductive springs in contact with the high-voltage electrode plate, each of the ground electrodes comprises a ground electrode plate and ground springs in contact with the ground electrode plate, and the conductive springs and the ground springs are in contact with the lower edges of the collection electrodes inserted in the slits of the radial portions of the distribution bracket.

6. The electrostatic-precipitator air cleaner according to claim 1, further comprising a fan connected to an upper portion of the shell.

7. The electrostatic-precipitator air cleaner according to claim 6, further comprising a hinge for pivotally connecting the fan to the shell and an elastic locking assembly for locking the fan to the shell.

8. The electrostatic-precipitator air cleaner according to claim 1, wherein the base comprises cavities, and the shell comprises:
   a front piece comprising feet inserted in some of the cavities; and
   a rear piece comprising feet inserted in the remaining ones of the cavities of the base.

9. The electrostatic-precipitator air cleaner according to claim 8, wherein the barrel is connected to the rear piece.

10. The electrostatic-precipitator air cleaner according to claim 1, wherein the barrel comprises guiding grooves in an internal face, and each of the radial portions of the upper and lower frames comprises a free end movable along the guiding grooves of the barrel to guide the precipitation module into or from the barrel.

* * * * *